United States Patent
Han et al.

(10) Patent No.: US 7,476,435 B2
(45) Date of Patent: *Jan. 13, 2009

(54) BACKED GROOVED WOOD FLOORING COMPOSED OF HPL, WATERPROOF PLYWOOD AND SOUNDPROOF LAYER, AND METHOD OF MANUFACTURING THE SAME

(75) Inventors: Kie-Sun Han, Cheongju-si (KR); Seong-Chan Park, Cheongju-si (KR)

(73) Assignee: LG Chem, Ltd. (KR)

( * ) Notice: Subject to any disclaimer, the term of this patent is extended or adjusted under 35 U.S.C. 154(b) by 512 days.

This patent is subject to a terminal disclaimer.

(21) Appl. No.: 10/546,930

(22) PCT Filed: Sep. 30, 2003

(86) PCT No.: PCT/KR03/01995

§ 371 (c)(1),
(2), (4) Date: Aug. 26, 2005

(87) PCT Pub. No.: WO2004/076177

PCT Pub. Date: Sep. 10, 2004

(65) Prior Publication Data

US 2006/0177633 A1    Aug. 10, 2006

(30) Foreign Application Priority Data

Feb. 28, 2003 (KR) .................. 10-2003-0012524

(51) Int. Cl.
- B32B 21/06 (2006.01)
- B32B 21/14 (2006.01)
- B32B 29/00 (2006.01)
- B32B 37/12 (2006.01)
- B32B 38/04 (2006.01)
- E04F 13/10 (2006.01)
- E04F 13/077 (2006.01)
- E04F 15/16 (2006.01)
- E04F 15/18 (2006.01)

(52) U.S. Cl. .............. 428/172; 428/167; 428/535; 428/537.1; 428/537.5; 156/268; 156/307.7; 156/335; 52/390; 52/403.1

(58) Field of Classification Search ............. 428/167, 428/172, 535, 537.1, 537.5; 52/390, 403.1; 156/268, 300, 305, 307.7, 335
See application file for complete search history.

(56) References Cited

U.S. PATENT DOCUMENTS 5,736,227 A * 4/1998 Sweet et al. ............. 428/192
2002/0136862 A1 * 9/2002 Dong et al. .............. 428/150

FOREIGN PATENT DOCUMENTS

| JP | 5-124139 | 5/1993 |
| KR | 1997-0058915 | 8/1997 |
| KR | 2000-0060158 | 10/2000 |
| KR | 2000-0071992 | 12/2000 |
| KR | 20-0273454 | 5/2002 |

OTHER PUBLICATIONS

PCT International Search Report; International Application No. PCT/KR2003/001995; International Filing Date: Sep. 30, 2003.

* cited by examiner

*Primary Examiner*—Donald Loney
(74) *Attorney, Agent, or Firm*—Cantor Colburn LLP

(57) ABSTRACT

Disclosed herein is a back-grooved laminate wood flooring in which a high pressure melamine laminate (HPL) is laminated on a waterproof plywood layer. The back-grooved laminate wood flooring comprises an upper HPL (20), an adhesive layer (40) and a waterproof plywood layer (10) wherein the upper HPL (20) includes a second core layer (25), a first core layer (23), a decorative paper layer (22) and a surface-protective paper layer (21) layered in this order from the bottom, the upper HPL (20) and waterproof plywood layer (10) are adhered to each other by the adhesive layer (40), and the waterproof plywood layer (10) is back grooved.

7 Claims, 2 Drawing Sheets

Fig. 1 *Prior Art*
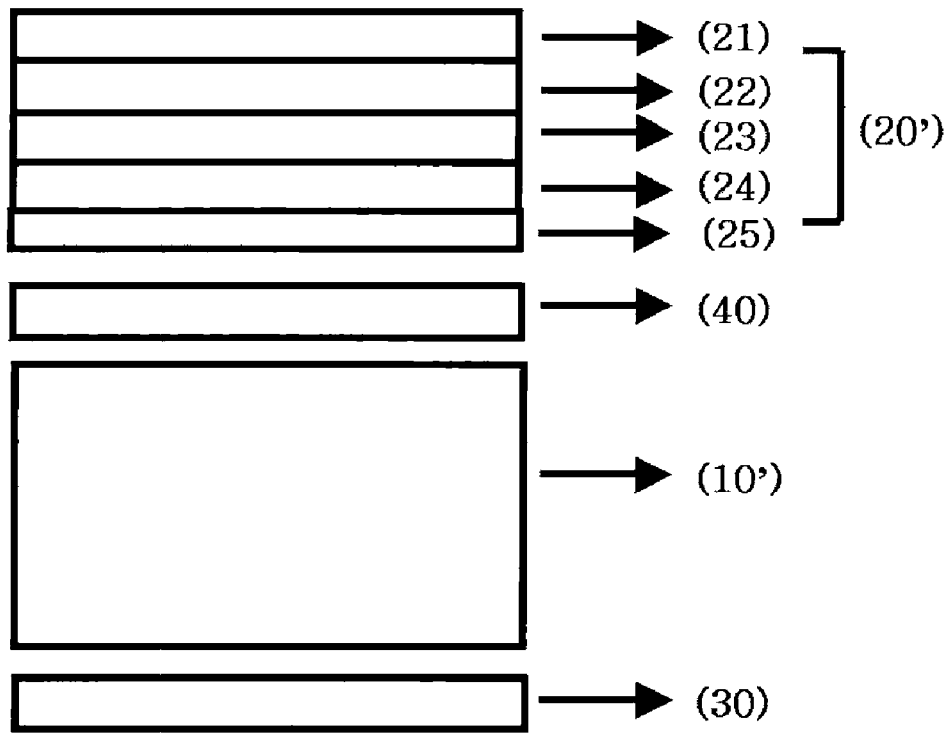
Fig. 2
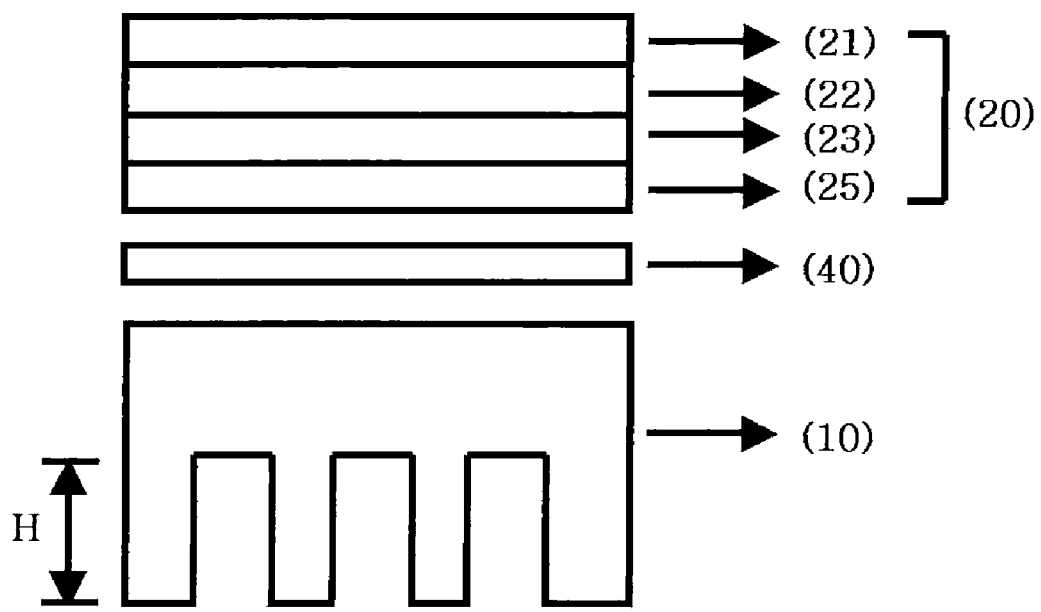

BACKED GROOVED WOOD FLOORING COMPOSED OF HPL, WATERPROOF PLYWOOD AND SOUNDPROOF LAYER, AND METHOD OF MANUFACTURING THE SAME

TECHNICAL FIELD

The present invention relates to a back-grooved laminate wood flooring in which a high pressure melamine laminate (hereinafter, referred to as a 'HPL') is laminated on a waterproof plywood layer, and a method for manufacturing the back-grooved laminate wood flooring. More particularly, the present invention relates to a back-grooved laminate wood flooring comprising an upper HBL, an adhesive layer and a waterproof plywood layer wherein the upper HPL includes a second core layer, a first core layer, a decorative paper layer and a surface-protective paper layer laminated in this order from the bottom, the upper HPL and waterproof plywood layer are adhered to each other by the adhesive layer and the waterproof plywood layer 10 is back grooved, and a method for manufacturing the back-grooved laminate wood flooring.

BACKGROUND ART

FIG. 1 is a cross-sectional view showing a conventional laminate wood flooring in which a lower HPL or a glass fiber layer is laminated instead of the lower HPL. As shown in FIG. 1, the conventional laminate wood flooring has a structure in which an upper HPL 30 is laminated to balance between upper and lower portions or a glass fiber layer 24 is laminated instead of the upper HPL 30, and an upper HPL 20' and a waterproof plywood layer 10' are adhered to each other by an adhesive layer 40.

The upper HPL 20' includes 1-3 sheets of core layers (23 and 25) which can be laminated to each other depending on the desired thickness. 30 Alternatively, for improved adhesion to the floor and economical efficiency, the glass fiber glass 24 can be added instead of the lower HPL 30, so that the upper HPL 20' includes the second core layer 25, the glass fiber layer 24, the first core layer 23, a decorative paper layer 22 and a surface-protective paper layer 21 laminated in this order from the bottom. The respective layers constituting the 35 conventional laminate wood flooring are briefly explained below with reference to FIG. 1.

The waterproof plywood layer 10' is produced by layering 5 to 7 veneers together using a phenol or melamine resin adhesive in such a manner that the grain directions of the veneers are at right angles to each other, and pressing the laminate in a press.

The core layers constituting the upper HPL 20' are produced by impregnating in a kraft paper a phenol resin and a melamine resin. Two or more sheets of the kraft paper can be used depending on the desired thickness.

The core layer 23 is produced by impregnating a kraft paper in a phenol resin, the decorative paper layer 22 is produced by impregnating a decorative paper having a printed pattern in a melamine resin, and the surface-protective paper layer 21 is produced by impregnating an overlay paper in a melamine resin. At this time, the overlay paper is prepared by uniformly distributing wear-resistant silica or alumina particles in a cellulose paper.

Since the conventional laminate wood flooring in which the HPL 20' is laminated on the waterproof plywood 10' uses the waterproof plywood layer 10' instead of a medium-density fiberboard (MDF), it exhibits excellent dimensional stability against heat and moisture. In addition, since the surface-protective paper layer 21 and the decorative paper 22 impregnated in a melamine resin, the conventional laminate wood flooring exhibits excellent surface physical properties.

In addition to the physical properties, the temperature stability of the conventional laminate wood flooring is measured by heating the conventional laminate wood flooring at 80° C. for 24 hours. The degree of shrinkage is measured and expressed in percentage (dimensional stability), and the occurrence of the curls is measured and expressed in length (curling property). The dimensional stability of the conventional laminate wood flooring is shown to be −0.1~0.2% and curling property is shown to be 0.5~5.0 mm. Further, after installation of the conventional laminate wood flooring, the dimensional stability is increased to −0.03~0.08%. Based on these dimensional stability, when the conventional laminate wood flooring having a length of 60 mm is used for an under-floor heating system, cracks of a maximum of 0.48 mm occur. Accordingly, the conventional laminate wood flooring causes consumer complaints. There is, thus, a need to make the size of cracks formed on the laminate wood flooring as small as possible. In addition, since the conventional laminate wood flooring comes off the floor, it has a problem in terms of its practicality.

The dimensional stability after installation is determined in accordance with the following procedure. A wood flooring product is laid on a concrete model having a predetermined size, the product is adhered to the concrete model using an adhesive by a common method, and the resulting structure is left at room temperature for 72 hours to sufficiently cure the adhesive. After the cured structure is heated at 80° C. for 24 hours, the shrinkage of the structure is measured and then expressed in percentage.

DISCLOSURE OF THE INVENTION

Therefore, the present invention has been made in view of the above problems, and it is an object of the present invention to provide a back-grooved laminate wood flooring in which a lower HPL 30 is laminated at its lower portion and at least one core layer is added to an upper HPL 20' instead of a glass fiber layer, thereby improving dimensional stability after installation, decreasing the occurrence of cracks, preventing the laminate wood flooring from coming off the floor and improving adhesion to the floor.

It is another object of the present invention to provide a method for manufacturing the back-grooved laminated wood flooring.

It is another object of the present invention to provide a back-grooved laminate wood flooring which further comprises at least one soundproof layer in order to improve soundproofing performance.

It is yet another object of the present invention to provide a method for manufacturing the back-grooved laminate wood flooring.

In order to accomplish the above objects of the present invention, there is provided a back-grooved laminate wood flooring comprising an BPL, an adhesive layer and a waterproof plywood layer laminated from the top wherein the HPL includes a second core layer, a first core layer, a decorative paper layer and a surface-protective paper layer layered in this order from the bottom, and the waterproof plywood layer is back-grooved.

The grooves formed on the back surface of the waterproof plywood layer preferably have a width of 1~2 mm and a depth of 1~4 mm. The back surface of the waterproof plywood layer is divided into i) a first groove portion at which 5~10 grooves are formed, ii) a second groove portion at which 5~20 grooves are formed and iii) a third groove portion at which 5~10 grooves are formed. The distance between one side edge of the back surface and the first groove portion and the distance between the opposite side edge and the third groove portion are in the range of 10~30 mm. The distance between the first and second groove portions and the distance between the second and third groove portions are in the range of 10~90 mm. In the respective groove portions, the distance between grooves is preferably in the range of 10~30 mm. These numerical ranges are optimum nominal ranges in view of manufacturing processes and structural characteristics of the finished product.

The laminate wood flooring of the present invention further comprises at least one soundproof layer laminated in at least one position selected from (a) between the HPL and the waterproof plywood layer, and (b) under the waterproof plywood layer.

According to the present invention, there is provided a method for manufacturing a back-grooved laminate wood flooring in which an HPL and a waterproof plywood are laminated, comprising the steps of: layering 5~7 veneers together using a phenol or melamine resin adhesive in such a manner that the grain directions of the veneers are at right angles to each other, and pressing the laminate in a press to produce a waterproof plywood layer; impregnating an overlay paper in a melamine resin to produce a decorative paper layer, the overlay paper being prepared by uniformly distributing wear-resistant silica or alumina particles in a cellulose paper; impregnating a decorative paper in a melamine resin to produce a decorative paper layer, the decorative paper being prepared by printing a predetermined pattern on a titanium oxide-containing cellulose paper; impregnating a kraft paper in a resol-type phenol resin to produce a first core layer; impregnating a kraft paper in a melamine resin to produce a second core layer; laying the second core layer, the first core layer, the decorative paper layer and the surface-protective paper layer in this order from the bottom, and pressing the resulting structure while heating to produce an upper BPL; applying an adhesive onto the waterproof plywood layer, to form an adhesive layer, and adhering the HPL to the adhesive layer; and grooving the back surface of the waterproof plywood layer. For reducing noise transmission between floors and imparting improved soundproofing performance, the method for manufacturing the laminate wood flooring further comprises the step of laminating at least one soundproof layer in at least one position selected from (a) between the HPL and the waterproof plywood layer and (b) under the waterproof plywood layer.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a cross-sectional view showing a conventional laminate wood flooring in which a lower HPL or a glass fiber layer is laminated instead of the lower HPL;

FIG. 2 is a cross-sectional view showing a laminated wood flooring in which a HPL and a back-grooved waterproof plywood are laminated, according to an embodiment of the present invention;

BEST MODE FOR CARRYING OUT THE INVENTION

Figure 3:
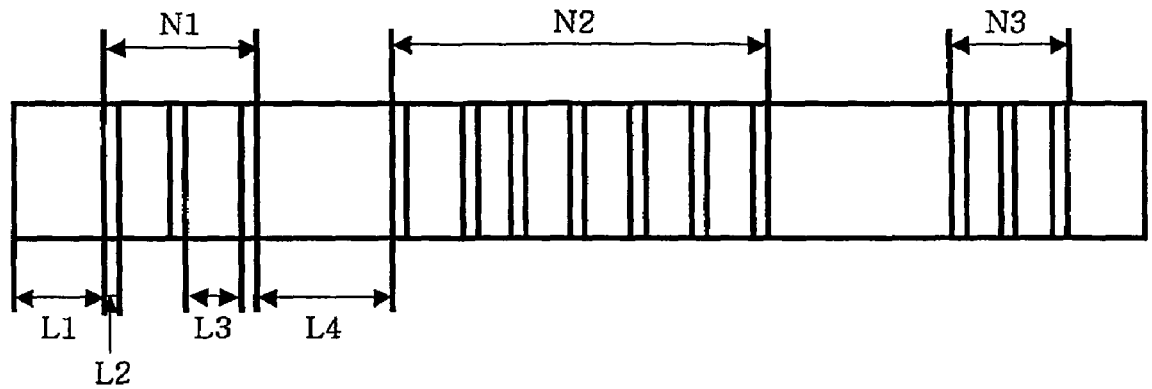
FIG. 3 is a rear view showing a laminate wood flooring in which a HPL and a back-grooved waterproof plywood are laminated, according to an embodiment of the present invention.

The present invention will now be described in more detail with reference to the following examples and accompanying drawings. However, these examples and drawings are not to be construed as limiting the scope of the invention.

FIG. 2 is a cross-sectional view showing a laminate wood flooring in which the lower HPL 30 shown in FIG. 1 is removed and a glass fiber layer 24 is replaced with two core layers 23 and 25, according to an embodiment of the present invention. As shown in FIG. 2, an upper HPL 20 and a waterproof plywood layer 10 are adhered to each other by an adhesive layer 40.

The upper HPL 20 includes 1~3 sheets of the second core layer 25, 1~3 sheets of the first core layer 23, a decorative paper layer 22 and a surface-protective paper layer 21 layered in this order from the bottom.

The waterproof plywood layer 10 is produced by layering 5~7 veneers together using a phenol or melamine resin adhesive, and grooving its back surface.

The respective layers constituting the back-grooved laminate wood flooring, and the lamination procedure are explained in detail below.

The waterproof plywood layer 10 is produced by layering 5~7 veneers together using a phenol or melamine resin adhesive in such a manner that the grain directions of the veneers are at right angles to each other, and pressing the laminate in a press. The waterproof plywood layer 10 thus produced exhibits little dimensional stability due to heat and moisture and thus is suitable for use in an under-floor heating system.

After the waterproof plywood layer 10 is heated at 80° C. for 24 hours, the shrinkage is measured and then expressed in percentage. As a result, the dimensional stability of the waterproof plywood layer 10 is −0.05~0.2%.

Next, each layer constituting the upper HPL 20 will be described.

First, the surface-protective paper layer 21 is produced to impart surface physical properties, e.g., wear resistance and scratch resistance, to the laminate wood flooring according to the present invention.

The surface-protective paper layer 21 is produced by impregnating an overlay paper in a melamine resin in an amount of 150~300% by weight, based on the weight of the overlay paper, followed by drying and semi-curing in an oven at 100~150° C. for 0.5~4 minutes. At this time, the overlay paper is prepared by uniformly distributing wear-resistant silica or alumina particles in a cellulose paper having a basis weight of 20~100 g/m$^2$.

The melamine resin is preferably prepared in a liquid state by mixing 30~45% by weight of melamine, 20~40% by weight of formaldehyde, 18~27% by weight of water as a solvent, 1~5% by weight of diethylene glycol as a modifier, about 1% by weight of sodium hydroxide as a pH-adjusting agent and 2~10% by weight of an amine-based basic catalyst as a curing agent.

By means of the wear-resistant particles and the melamine resin, the surface-protective paper layer 21 exhibits a high wear resistance of 200~20,000 times when abraded with sandpaper.

The decorative paper layer 22 underlying the surface-protective paper layer 21 is produced to impart a predetermined pattern to the laminate wood flooring of the present invention.

The decorative paper layer 22 is produced by impregnating a decorative paper in a melamine resin in an amount of 60~150% by weight, based on the weight of the decorative paper, followed by drying and semi-curing in an oven at 80~150° C. for 0.5~4 minutes. At this time, the decorative paper is prepared by printing a predetermined pattern on a titanium oxide-containing cellulose paper having a basis weight of 80~120 g/m$^2$ by gravure printing.

The melamine resin is preferably prepared in a liquid state by mixing 30~45% by weight of melamine, 20~40% by weight of formaldehyde, 18~27% by weight of water as a solvent, 1~5% by weight of diethylene glycol as a modifier, about 1% by weight of sodium hydroxide as a pH-adjusting agent and 2~10% by weight of an amine-based basic catalyst as a curing agent. Instead of the melamine resin, polyester, diarylphthalate or phenol resins can be used.

Next, the first and second core layers 23 and 25 are produced in such a manner that the surface-protective paper layer 21 and the decorative paper layer 22 are supported and the HPL is made in a sheet form having a certain thickness.

The first core layer 23 is produced by impregnating a kraft paper having a basis weight of 80~300 g/m$^2$ in a resol-type phenol resin in an amount of 30~60% by weight, based on the weight of the kraft paper, followed by drying and semi-curing in an oven at 150~200° C. for 10~60 seconds.

The phenol resin is a resol-type resin in a liquid state prepared by mixing 33~54% by weight of phenol, 30~46% by weight of formaldehyde, 4~6% by weight of ethyl alcohol as a solvent, 2~5% by weight of water as a solvent, and 5~15% by weight of an amine-based basic catalyst as a modifier.

Two or more sheets of the first core layer 23 can be used depending on the desired thickness.

The second core layer 25 is produced by impregnating a kraft paper having a basis weight of 80~300 g/m$^2$ in a melamine resin in an amount of 40~150% by weight, based on the weight of the kraft paper, followed by drying and semi-curing in an oven at 80~150° C. for 0.5~3 minutes.

The melamine resin is prepared in a liquid state by mixing 30~45% by weight of melamine, 20~40% by weight of formaldehyde, 18~27% by weight of water as a solvent, 1~5% by weight of diethylene glycol as a modifier, about 1% by weight of sodium hydroxide as a pH-adjusting agent and 2~10% by weight of an amine-based basic catalyst as a curing agent.

Two or more sheets of the second core layer 25 can be used depending on the desired thickness.

The upper HPL 20 is produced by laying the second core layer 25, the first core layer 23, the decorative paper layer 22 and the surface-protective paper layer 21 in this order from the bottom, pressing the resulting structure in a press under 60~100 kg/cm$^2$ at 125~155° C. for 15~60 minutes, and cooling the laminate under the same pressure for 15~30 minutes.

The temperature stability of the upper HPL 20 is measured by heating the HPL 20 at 80° C. for 24 hours. The degree of shrinkage is measured and expressed in percentage (dimensional stability), and the occurrence of the curls is measured and expressed in length (curling property). The dimensional stability of the HPL 20 is shown to be −0.05~0.3% and curling property is shown to be 0.5~5.0 mm.

Finally, the adhesive layer 40 adheres the waterproof plywood layer 10 to the upper HPL 20.

As an adhesive used to produce the adhesive layer 40, a room temperature-curable urethane resin is used.

The adhesive layer 40 is produced by applying the room temperature-curable urethane resin onto the waterproof plywood layer 10 in an amount of 80~200 g/m$^2$, after which the upper HPL 20 is laid on the adhesive layer 40, pressed at a pressure of 5 kgf/cm$^2$ for 2 hours, and dried at 80° C. for 2 hours.

The press of the waterproof plywood layer 10 and the upper HPL 20 at room temperature can minimize deformation due to heat.

Following the lamination procedure, the back surface of the waterproof plywood layer 10 is grooved. Referring to FIG. 2, H designates the depth of grooves. The grooves are preferably cut to have a depth of 1~4 mm. Referring specifically to FIG. 3, the grooves are cut so that L1 is 10~30 mm, L2 is 1~2 mm, L3 is 10~30 mm and L4 is 10~90 mm. In the number of the grooves, 5~10 grooves are formed at N1 portion, 5~20 grooves are formed at N2 portion, and 5~10 grooves are formed at N3 portion.

FIG. 3 is a rear view showing the waterproof plywood layer in which a number of grooves are formed. N1 designates a first groove portion, N2 designates a second groove portion, N3 designates a third groove portion, L1 designates the distance between the first groove portion and one side edge of the back surface, and the distance between the first groove portion and the opposite side edge of the back surface, L2 designates the width of grooves, L3 designates the distance between grooves, L4 designates the distance between the first and the second groove portions and the distance between the second and the third groove portions.

Figure 4:
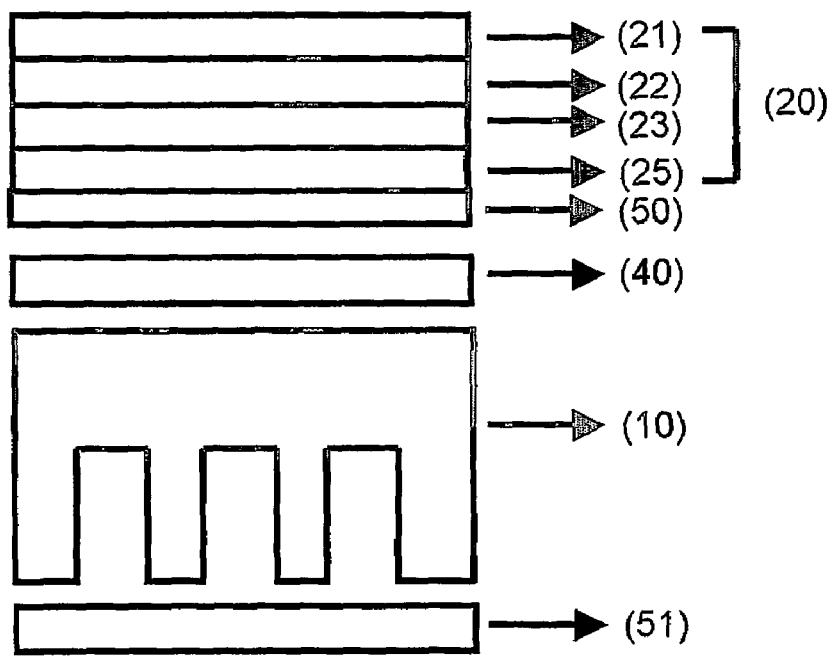
FIG. 4 is a cross-sectional view showing another laminate wood flooring of the present invention in which two soundproof layers are added to the laminate wood flooring of FIG. 2.

FIG. 4 is a cross-sectional view showing another laminate wood flooring of the present invention in which two soundproof layers are added to the laminate wood flooring of FIG. 2. As shown in FIG. 4, the first soundproof layer 50 is interposed between the upper HPL 20 and the adhesive layer 40, and a second soundproof layer 51 underlies the waterproof plywood layer 10. However, the position and number of the soundproof layers are not specially limited.

As materials of the soundproof layers, polyethylene (PE), ethylene vinyl acetate (EVA), polypropylene (PP), polyurethane (PU), polyester non-woven fabrics, chloroprene rubber (CR), acrylonitrile butadiene rubber (NBR), etc., can be used. In addition, the surface of the soundproof layers can be processed by a chemical cross-linking and foaming process or a high-pressure foaming process.

EXAMPLES

1. Production of Waterproof Plywood Layer 10

A waterproof plywood layer 10 was produced by layering 5 veneers together using a phenol resin adhesive in such a manner that the grain directions of the veneers were at right angles to each other, and pressing the laminate in a press.

2. Production of Upper HPL 20

1) Production of Surface-Protective Paper Layer 21

A surface-protective paper layer 21 was produced by impregnating an overlay paper in a melamine resin in an amount of 250% by weight, based on the weight of the overlay paper, followed by drying and semi-curing in an oven at 130° C. for 3 minutes. At this time, the overlay paper was prepared by uniformly distributing wear-resistant silica or alumina particles in a cellulose paper having a basis weight of 38 g/m$^2$.

The melamine resin was prepared in a liquid state by mixing 37% by weight of melamine, 23% by weight of formaldehyde, 25% by weight of water, 1% by weight of diethylene glycol, 0.3% by weight of sodium hydroxide and 3.7% by weight of an amine-based basic catalyst.

2) Production of Decorative Paper Layer 22

A decorative paper layer 22 was produced by impregnating a decorative paper in a melamine resin in an amount of 100% by weight, based on the weight of the decorative paper, followed by drying and semi-curing in an oven at 120° C. for 2 minutes. At this time, the decorative paper was prepared by printing a predetermined pattern on a titanium oxide-containing cellulose paper having a basis weight of 100 g/m².

The melamine resin was prepared in a liquid state by mixing 37% by weight of melamine, 33% by weight of formaldehyde, 25% by weight of water as a solvent, 1% by weight of diethylene glycol, 0.3% by weight of sodium hydroxide and 3.7% by weight of an amine-based basic catalyst.

3) Production of First Core Layer 23

A first core layer 23 was produced by impregnating a kraft paper having a basis weight of 200 g/m² in a phenol resin in an amount of 60% by weight, based on the weight of the kraft paper, followed by drying and semi-curing in an oven at 190° C. for 30 seconds.

At this time, the phenol resin was prepared in a liquid state by mixing 49% by weight of phenol, 33% by weight of formaldehyde, 5% by weight of ethyl alcohol, 3% by weight of water and 10% by weight of an amine-based basic catalyst.

4) Production of Second Core Layer 25

A second core layer 25 was produced by impregnating a kraft paper having a basis weight of 200 g/m² in a melamine resin in an amount of 100% by weight, based on the weight of the kraft paper, followed by drying and semi-curing in an oven at 130° C. for 3 minutes.

At this time, the melamine resin was prepared in a liquid state by mixing 37% by weight of melamine, 33% by weight of formaldehyde, 25% by weight of water, 1% by weight of diethylene glycol, 0.3% by weight of sodium hydroxide and 3.7% by weight of an amine-based basic catalyst.

5) Production of Upper HPL 20

1~3 sheets of the second core layer 25, 1~3 sheets of the first core layer 23, the decorative paper layer 22 and the surface-protective paper layer 21 were laid in this order from the bottom, pressed in a press under 100 kg/cm² at 130° C. for 30 minutes, and then cooled under the same pressure for 25 minutes to produce an upper HPL 20.

3. Formation of Adhesive Layer 40 on Waterproof Plywood Layer 10, and Lamination of Upper HPL 20 thereon An adhesive layer 40 is produced by applying a room temperature-curable urethane resin onto the waterproof plywood layer 10 in an amount of 120 g/m², after which the upper HPL 20 was laid on the adhesive layer 40, pressed at a pressure of 5 kgf/cm² for 2 hours, and dried at 80° C. for 2 hours.

4. Back Grooving of Waterproof Plywood Layer 10

Finally, the back surface of the waterproof plywood layer 10 was grooved to have the following dimensions.

Grooves were cut to have a depth of 1~4 mm (H shown in FIG. 2). As shown in FIG. 3, the grooves were cut so that L1 was 10~30 mm, L2 was 1~2 mm, L3 was 10~30 mm and L4 was 10~90 mm. 5~10 grooves were formed at N1 portion, 5~20 grooves were formed at N2 portion, and 5~10 grooves were formed at N3 portion of the back surface.

The dimensional stability of the laminate wood flooring (Example) of the present invention after installation was compared with that of a conventional laminate wood flooring in which the back surface was not grooved (Comparative Example). The results are shown in Table 1.

TABLE 1

|  | Example | Comparative Example |
|---|---|---|
| Dimensional stability after installation (%) | −0.02~−0.04 | −0.03~−0.08 |
| Crack size (mm) | 0.24 | 0.48 |

The dimensional stability after installation was determined in accordance with the following procedure. A wood flooring product was laid on a concrete model having a predetermined size, the product was adhered to the concrete model using an adhesive by a common method, and the resulting structure was left at room temperature for 72 hours to sufficiently cure the adhesive. After the cured structure was heated at 80° C. for 24 hours, the shrinkage of the structure was measured and then expressed in percentage.

As can be seen from the data shown in Table 1, the laminate wood flooring of the present invention exhibited a low dimensional stability and a small crack size (0.24 mm) according to the dimensional stability, which is below a lower limit (0.4 mm) capable of causing consumer complaints. Since the laminate wood flooring of the present invention was back-grooved instead of the lower HPL 30 and the glass fiber layer 24, it can minimize the deformation due to external temperature and stress.

INDUSTRIAL APPLICABILITY

As apparent from the above description, since the laminate wood flooring of the present invention is back-grooved instead of the lower HPL 30 and the glass fiber layer 24, it exhibits improved dimensional stability and adhesion to the floor after installation (−0.02~0.04 mm after heating at 80° C. for 24 hours), and reduces the occurrence of cracks (below 0.24 mm in the case of a 600 mm long laminate wood flooring for an under-floor heating system), which is below a lower limit (0.4 mm) capable of causing consumer complaints. In addition, the design of the laminate wood flooring according to the present invention prevents it from coming off the floor after installation. Furthermore, since the back-grooved laminate wood flooring of the present invention further comprises at least one soundproofing layer, soundproofing performance is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A back-grooved laminate wood flooring comprising a high pressure melamine laminate (HPL), an adhesive layer and a waterproof plywood layer laminated from the top,
   wherein the HPL includes a second core layer, a first core layer, a decorative paper layer and a surface-protective paper layer layered in this order from the bottom, and the waterproof plywood layer has grooves in the back surface, and
   wherein the first core layer is formed of a kraft paper impregnated in a resol-type phenol resin; the second core layer is formed of a kraft paper impregnated in a melamine resin; the decorative paper layer is formed of a decorative paper impregnated in a melamine resin, the decorative paper being formed of a titanium oxide-containing cellulose paper with a predetermined pattern printed thereon; the surface-protective paper layer is formed of an overlay paper impregnated in a melamine resin, the overlay paper being formed of a cellulose paper with wear-resistant silica or alumina particles uniformly distributed therein; and the waterproof plywood layer is formed of 5-7 veneers with a phenol resin or melamine resin adhesive disposed in-between and pressed in such a manner that the grain directions of the veneers are at right angles to each other.

2. The back-grooved laminate wood flooring according to claim 1, wherein the grooves have a width of 1-2mm.

3. The back-grooved laminate wood flooring according to claim 1, wherein the grooves have a depth of 1-4mm.

4. The back-grooved laminate wood flooring according to claim 1, wherein the back surface of the waterproof plywood layer is divided into a first groove portion having 5-10 grooves therein, a second groove portion having 5-20 grooves therein and a third groove portion having 5-10 grooves therein; and the distance between one side edge of the back surface and the first groove portion and the distance between the opposite side edge and the third groove portion are in the range of 10-30mm, the distance between the first and second groove portions and the distance between the second and third groove portions are in the range of 10-90mm, and the distance between grooves in the respective groove portions is in the range of 10-30mm.

5. The back-grooved laminate wood flooring according to any one of claims 1 to 4, further comprising at least one soundproof layer laminated in at least one position selected from (a) between HPL and the waterproof plywood layer, and (b) under the waterproof plywood layer.

6. A method of manufacturing a back-grooved laminate wood flooring in which a high pressure melamine laminate (HPL) and a waterproof plywood are laminated, comprising the steps of:

layering 5-7 veneers together using a phenol resin or melamine resin adhesive in such a manner that the grain directions of the veneers are at right angles to each other to make a laminate, and pressing the laminate to produce a waterproof plywood layer;

impregnating an overlay paper in a melamine resin to produce a surface-protective paper layer, the overlay paper being prepared by uniformly distributing wear-resistant silica or alumina particles in a cellulose paper;

impregnating a decorative paper in a melamine resin to produce a decorative paper layer, the decorative paper being prepared by printing a predetermined pattern on a titanium oxide-containing cellulose paper;

impregnating a kraft paper in a resol-type phenol resin to produce a first core layer;

impregnating a kraft paper in a melamine resin to produce a second core layer;

laying the second core layer, the first core layer, the decorative paper layer and the surface-protective paper layer in this order from the bottom, and pressing the resulting layers while heating to produce an upper high pressure melamine laminate (HPL);

applying an adhesive onto the waterproof plywood layer to form an adhesive layer thereon, and adhering the HPL to the adhesive layer; and grooving the waterproof plywood layer in the back surface.

7. The method of manufacturing a back-grooved laminate wood flooring according to claim 6, further comprising the step of laminating at least one soundproof layer in at least one position selected from (a) between the HPL and the waterproof plywood layer or (b) under the waterproof plywood layer.

* * * * *